United States Patent [19]

Forget et al.

[11] Patent Number: 5,098,162
[45] Date of Patent: Mar. 24, 1992

[54] SEAT BELT BUCKLE ANCHOR COVER

[75] Inventors: Ken M. Forget; Mark F. Gray, both of Ontario, Canada

[73] Assignee: TRW Vehicle Safety Systems Ltd., Midland, Canada

[21] Appl. No.: 612,393

[22] Filed: Nov. 9, 1990

[51] Int. Cl.$^5$ ............................................. A47C 31/00
[52] U.S. Cl. ..................................... 297/482; 403/109
[58] Field of Search ................. 297/482, 468; 403/105, 403/109, 377, 204; 24/115 A

[56] References Cited

U.S. PATENT DOCUMENTS

| | | | |
|---|---|---|---|
| 3,318,634 | 5/1967 | Nicholas | 297/482 |
| 4,135,274 | 1/1979 | Freeman | 403/109 X |
| 4,140,412 | 2/1979 | Vitt | 24/115 A X |
| 4,199,190 | 4/1980 | Lindblad | 297/482 |
| 4,611,854 | 9/1986 | Pfeiffer | 297/468 |
| 4,645,231 | 2/1987 | Takeda | 297/482 X |
| 4,915,451 | 4/1990 | Forgel et al. | 297/468 |

Primary Examiner—Kenneth J. Dorner
Assistant Examiner—James M. Gardner
Attorney, Agent, or Firm—Tarolli, Sundheim & Covell

[57] ABSTRACT

A telescoping cover for a seat belt buckle anchor includes a first tubular member and a second tubular member. A portion of the second tubular member is slidably received in the first tubular member. When the telescoping cover is extended to cover the seat belt buckle anchor, the parts interlock. In a first embodiment, when the cover is in the extended position, a plurality of projecting fingers on the first tubular member engage an end surface of the second tubular member to interlock the first and second tubular members in the extended position. In a second embodiment, a plurality of ribs are spaced longitudinally along one tubular member. The ribs are engageable with a projection on the other tubular member to lock the cover in a selected one of a plurality of extended positions.

16 Claims, 4 Drawing Sheets

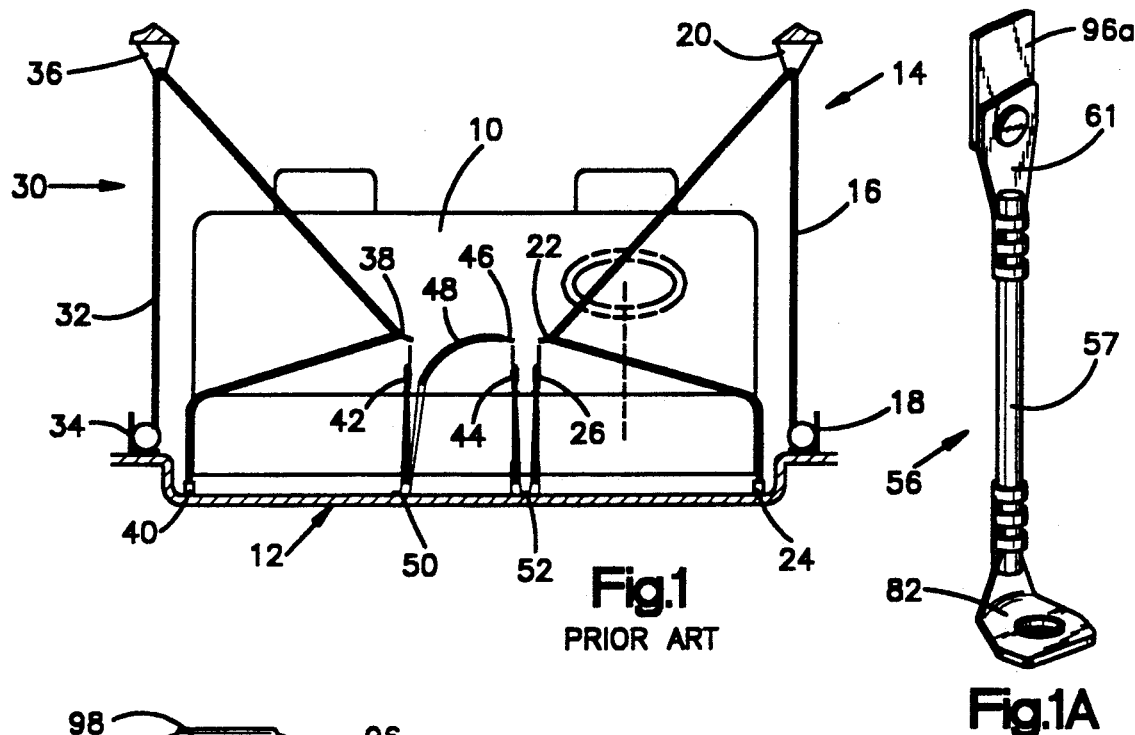
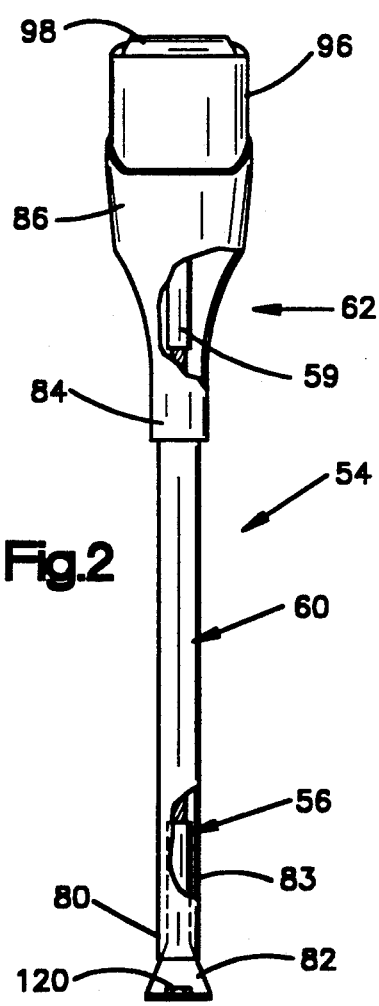
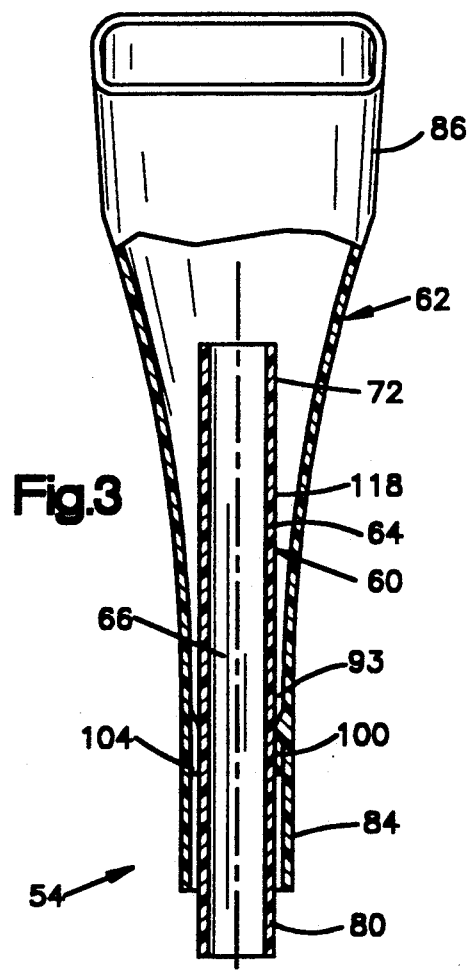
Fig.1 PRIOR ART
Fig.1A
Fig.2
Fig.3

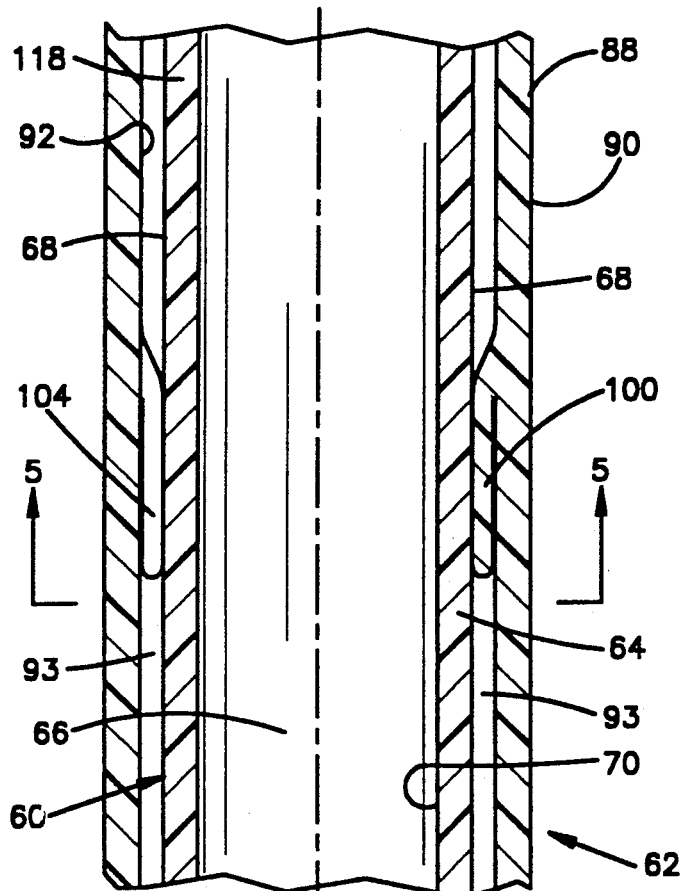
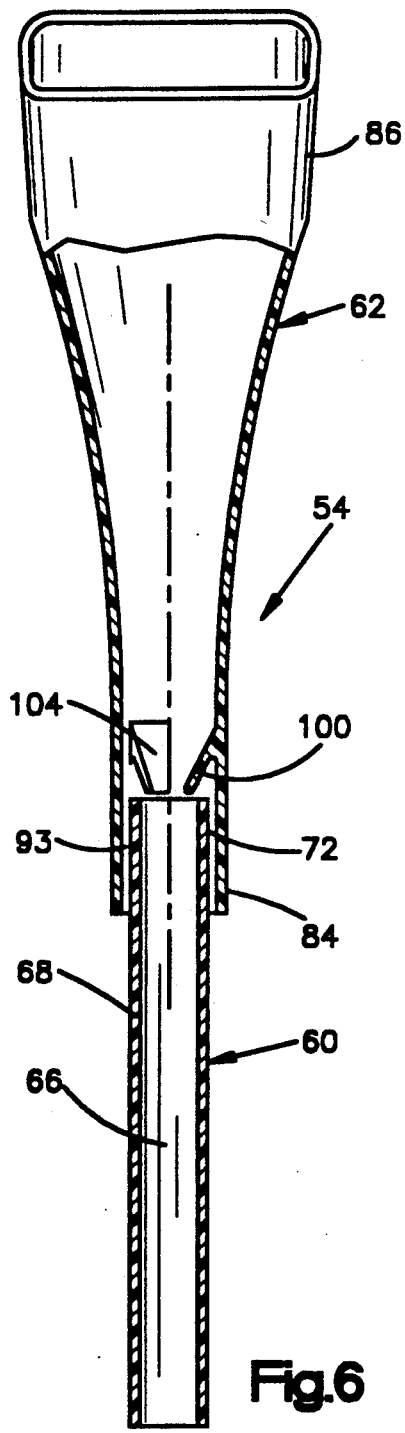
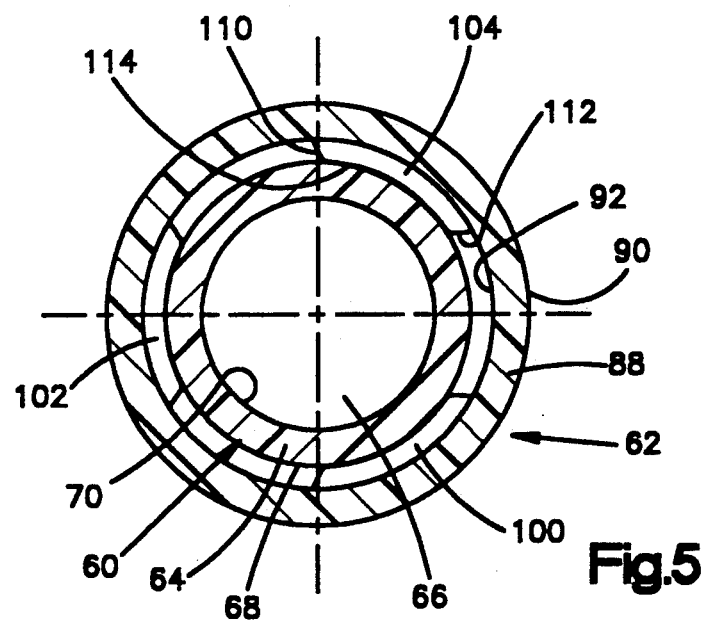

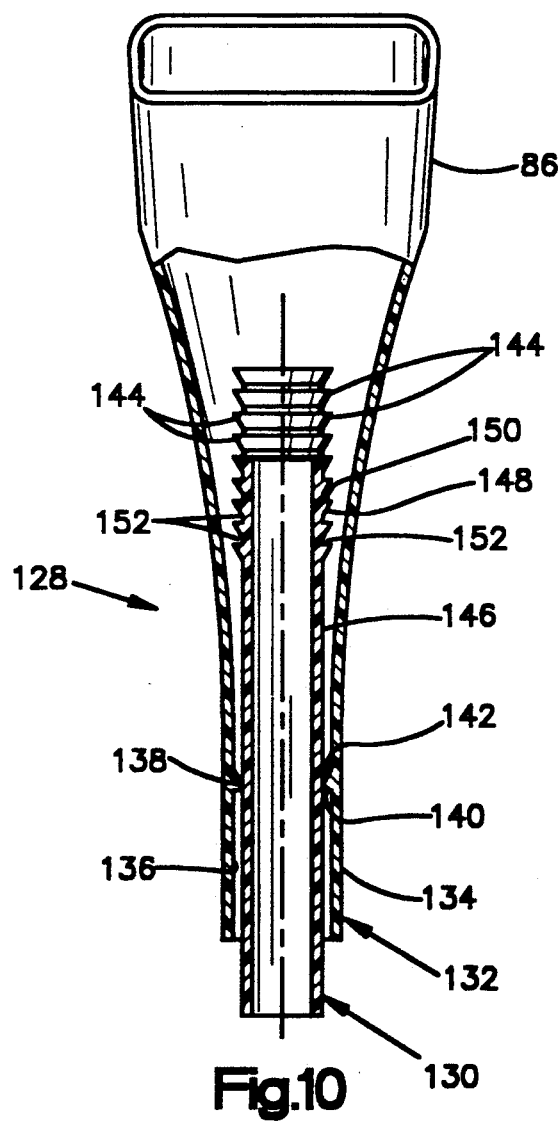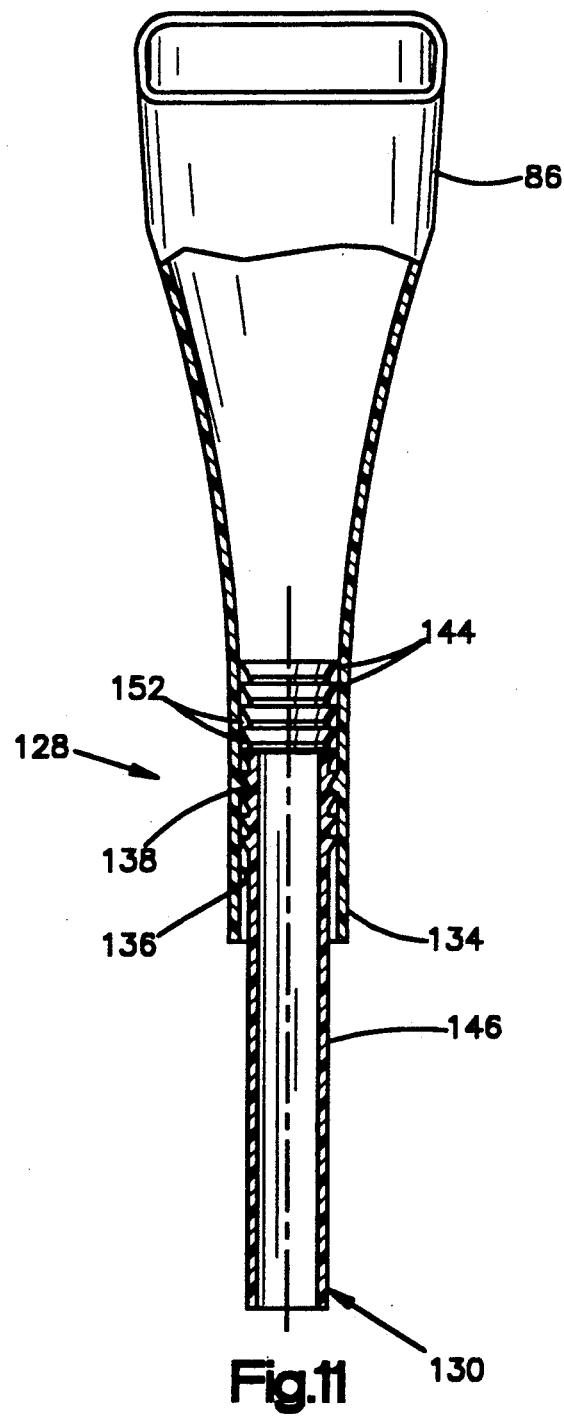

SEAT BELT BUCKLE ANCHOR COVER

BACKGROUND OF THE INVENTION

1. Technical Field

The present invention relates to a cover for a vehicle seat belt buckle anchor and, more particularly, the present invention relates to a seat belt buckle anchor cover which includes telescoping parts 2. Description of the Prior Art A vehicle seat belt buckle is typically secured to the vehicle by an anchor. The anchor may be of different constructions. Commonly, the anchor is a cable which is secured to the buckle and to a part of the vehicle. A seat belt buckle anchor cover encloses the anchor.

A seat belt buckle anchor cover which includes telescoping parts is known. When the parts are telescopically collapsed together, assembly operations can be performed, such as securing the anchor to the buckle. When the parts are extended, one part adjacent the buckle interlocks with the buckle cover. Since the buckle moves and twists during use, there is some tendency for the buckle and the one part of the cable cover to become disconnected. If this happens, the parts of the cover telescopically collapse relative to each other and uncover the anchor.

SUMMARY OF THE INVENTION

The present invention is a cover for a seat belt buckle anchor. The cover includes first and second tubular parts through which the anchor extends The first and second parts are longitudinally movable relative to each other between a collapsed position in which the parts cover a lesser longitudinal extent of the anchor and an extended position in which the parts cover a greater longitudinal extent of the anchor. The first and second parts have interlocking portions for blocking relative longitudinal movement of the first and second parts from the extended position toward the collapsed position.

In a first embodiment of the invention, a portion of the second tubular part is slidably received in the first tubular part. When the first and second tubular parts are in the extended position, a plurality of projecting fingers on the first tubular part engage an end surface of the second tubular part to interlock the first and second tubular parts and block relative longitudinal movement of the first and second tubular parts toward the collapsed position.

In a second embodiment of the invention, a plurality of ribs are spaced longitudinally along one tubular part The ribs are selectively engageable with a projection on the other tubular part to lock the first and second tubular parts in a selected one of a plurality of extended positions. Each rib has a blocking surface for blocking movement of the projection longitudinally over the rib in a direction of movement of the first and second tubular members toward the collapsed position.

BRIEF DESCRIPTION OF THE DRAWINGS

Further features of the present invention will become apparent to those skilled in the art to which the present invention relates from reading the following specification with reference to the accompanying drawings, in which:

FIG. 1 is a schematic front view of a vehicle seat having three occupant seating positions with occupant restraints including seat belt buckle anchors;

FIG. 1A is a view of a seat belt buckle anchor of FIG. 1 with part of the buckle removed;

FIG. 2 is an front elevational view of a seat belt buckle anchor with a cover in accordance with the present invention;

FIG. 3 is a longitudinal sectional view of the cover of FIG. 2 in a collapsed position;

FIG. 4 is an enlarged view of a portion of FIG. 3;

FIG. 5 is a transverse sectional view taken along line 5—5 of FIG. 4;

FIG. 6 is a longitudinal sectional view of the cover of FIG. 2 in an over-extended position;

FIG. 10 is an elevational view, partially in section, of a cover in accordance with a second embodiment of the invention and showing parts of the cover in a collapsed position; and FIG. 11 is a longitudinal sectional view of the cover of FIG. 10 and showing parts of the cover in an extended and interlocked position.

DESCRIPTION OF PREFERRED EMBODIMENTS OF THE INVENTION

Figure 7:
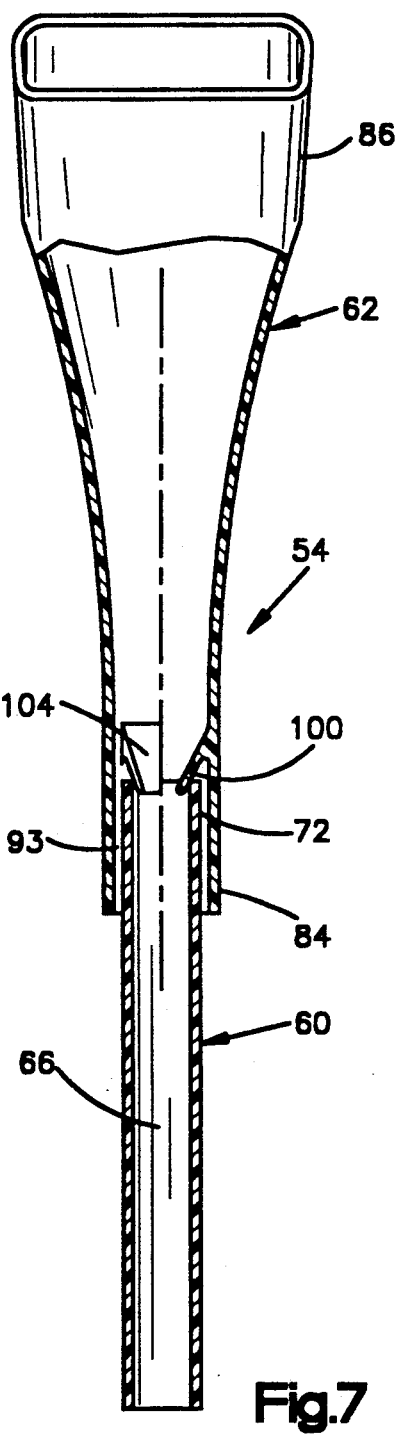
FIG. 7 is a longitudinal sectional view of the cover of FIG. 2 in an extended and interlocked position.

By way of example, FIG. 1 illustrates schematically a vehicle front bench seat 10 with seating positions for a driver, a center passenger, and a right side passenger. The seat is located on a vehicle floor structure 12. The driver seating position has a three-point continuous loop seat belt system 14 including a length of belt webbing 16. The webbing 16 extends from a floor mounted retractor 18 through a D-ring 20 and an adjustable tongue assembly 22. The belt webbing 16 is anchored at an anchorage point 24 to the vehicle structure 12. The tongue assembly 22 is connectable with a buckle 26.

The right side passenger seating position also has a three-point continuous loop seat belt system 30 which includes a length of belt webbing 32. The webbing 32 extends from a floor mounted retractor 34 and passes through a D-ring 36 and an adjustable tongue assembly 38. The belt webbing 32 is anchored at a floor anchorage point 40. The adjustable tongue assembly 38 is connectable with a buckle 42.

The center occupant seating position has a lap belt restraint system which includes a buckle 44 anchored at anchorage point 52 to the vehicle floor. The buckle 44 is connectable to a tongue 46. The tongue 46 is fixed to the end of a length of a lap belt webbing 48 which is attached to the vehicle floor at an anchorage point 50.

Each of the seat belt buckles 26, 42, and 44 is connected to its anchorage point by a seat belt buckle anchor. The seat belt buckle anchor may be of the type shown in FIG. 7 of U.S. Pat. No. 4,915,451 which is reproduced as FIG. 1A herein.

FIG. 1A illustrates a seat belt buckle anchor 56 including a length of cable 57. The cable 57 extends between a seat belt buckle 96 (shown in FIG. 2) and an anchor plate 82. The anchor plate 82 is crimped to one end of the cable 57. An attachment plate 61 which is part of the anchor 56 is crimped to the other end of the cable 57. The anchor plate 82 is connectable to the vehicle structure by a fastener 120 (FIG. 2). The attachment plate 61 is fixed to a base plate 96a (shown in FIG. 1A) of the buckle 96.

The present invention is a cover 54 for the seat belt buckle anchor 56. The cover 54 (FIGS. 2-8) includes an inner tube 60 which is slidably received in an outer tube 62. The inner tube 60 has a cylindrical wall 64 defining a central passage 66 extending longitudinally through the inner tube 60. The wall 64 has a cylindrical outer wall surface 68 (FIG. 4) and a cylindrical inner wall surface 70.

At one end portion 72 (FIG. 8) of the inner tube 60, within the outer tube 62, the outer wall surface 68 and the inner wall surface 70 of the inner tube 60 are joined by an annular end surface 74 of the inner tube 60. The end surface 74 intersects the outer wall surface 68 at a corner 76. The end surface 74 intersects the inner wall surface 70 at a corner 78.

The opposite end portion 80 (FIG. 2) of the inner tube 60 fits over a part of the anchor plate 82. The end portion 80 of the inner tube 60 is press fit over the part of the anchor plate 82. Thus, movement of the inner tube 60 relative to the anchor plate 82 is prevented.

The outer tube 62 (FIG. 2) includes a cylindrical portion 84 and a widened sleeve portion 86 The sleeve portion 86 of the outer tube 62 partially encloses the buckle 96 but not the buckle release button 98 (see FIG. 2). The sleeve portion 86 fits snugly around the buckle 96. The sleeve portion 86 does not interlock with the buckle 96.

The cylindrical portion 84 of the outer tube 62 includes a wall 88 (FIG. 8) having an outer wall surface 90 and an inner wall surface 92. The inner wall surface 92 defines a central passage 93 extending longitudinally through the outer tube 62.

Three locking fingers 100, 102, and 104 are formed on the inner wall surface 92 of the outer tube 62. The locking fingers 100, 102, and 104 are formed in one piece with the outer tube 62. The outer tube 62 and the fingers 100, 102, and 104 are made of a resilient material. Such a material may be a low density polyethylene the exterior surface of which can be textured. The three locking fingers 100, 102 and 104 are equally spaced around the inner wall surface 92 of the outer tube 62. Each locking finger projects radially from the inner wall surface 92 at an angle of about 32°. Each locking finger extends circumferentially around the inner wall surface 92 of the outer tube 62 for approximately 60°.

Figure 9:
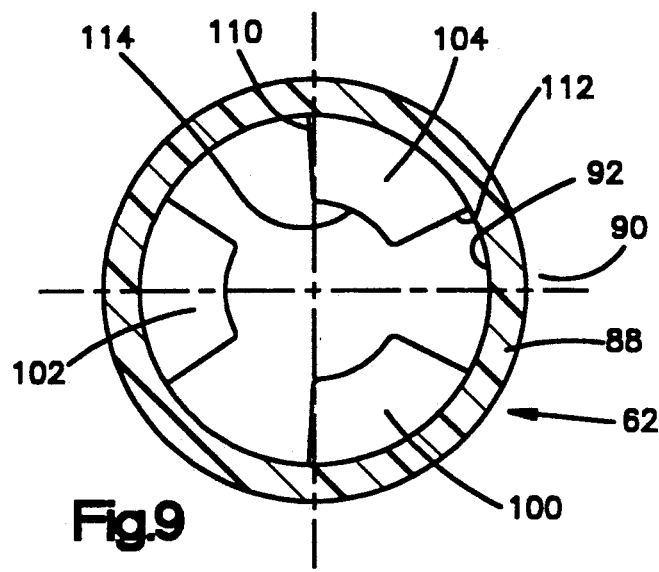
FIG. 9 is a transverse sectional view of one part of the cover of FIGS. 3 through 8.

A first major side surface 106 of each locking finger 100, 102, and 104 faces inwardly toward the center of the outer tube 62. A second major side surface 108 of each locking finger faces outwardly toward the inner wall surface 92. Each finger has side edges 110 and 112 (FIG. 9) and a curved inward edge 114.

Figure 8:
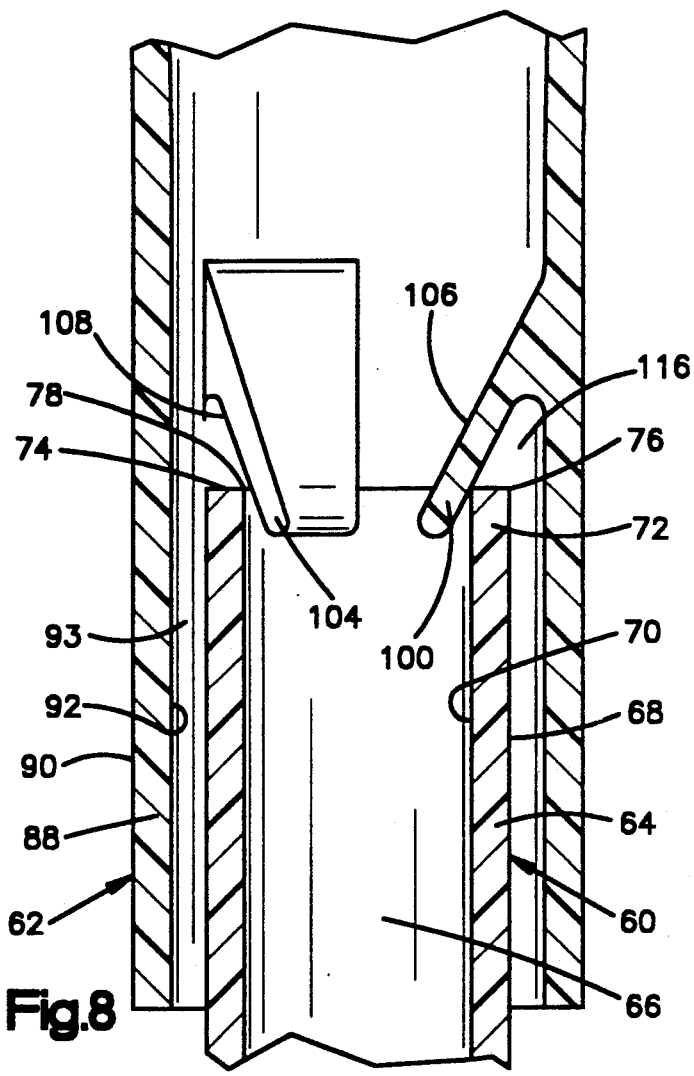
FIG. 8 is an enlarged view of a portion of FIG. 7.

As shown in FIG. 8, a space 116 is defined between the second major side surface 108 of each finger and the inner wall surface 92 of the outer tube 62. The locking fingers 100, 102, and 104 can be pressed radially outwardly toward the inner wall surface 92 of the outer tube 62, and will spring back to the position shown in FIG. 6 when released.

FIGS. 3, 4, and 5 illustrate the cover 54 in a collapsed position. When the cover 54 is in the collapsed position, a portion 118 of the inner tube 60 extends above the fingers 100, 102, and 104. The fingers 100, 102, and 104 are trapped between the outer wall surface 68 of the inner tube 60 and the inner wall surface 92 of the outer tube 62. The fingers 100, 102, and 104 are held radially outwardly by the outer wall surface 68 of the inner tube 60.

When the cover 54 is extended by sliding the inner tube 60 and the outer tube 62 apart, the fingers 100, 102 and 104 pass the end portion 72 of the inner tube 60. The fingers 100, 102 and 104 are no longer held radially outwardly by the inner tube 60, and they spring inwardly as shown in FIG. 6. In this overextended position, a substantial portion of each finger 100, 102, and 104 is located radially inwardly of tho outer wall surface 68 of the inner tube 60.

The inner tube 60 and the outer tube 62 are then slid together. The end portion 72 of the inner tube 60 becomes located in the space 116 below the locking fingers 100, 102, and 104. The locking fingers 100, 102, and 104 then engage the end portion 72 of the inner tube 60 as shown in FIG. 8. The second major side surface 108 of each finger engages the corner 78 on the inner tube 60 and the end surface 74 on the inner tube 60. The fingers 100, 102, and 104 block movement of the cover 54 toward the collapsed position. The inner tube 60 and the outer tube 62 are thus interlocked in the extended position.

It should be noted that the number of locking fingers provided on the outer tube 62 does not have to be three, but can be any suitable number. Similarly, the actual sizes, shapes, and arrangement of the fingers is a design choice. There could even be only one projecting finger or portion which extends partially or completely circumferentially around the inner wall surface 92 of the outer tube 62.

For assembly of the cover 54 and the anchor 56, without the buckle 96 on the anchor, the cover 54, in a collapsed position, is slid longitudinally over the free end of the anchor 56 to be attached to the buckle. When the end portion 80 of the inner tube 60 engages the anchor plate 82, it stops further movement of the cover 54. The buckle base plate 96a is then attached to the anchor 56. At this point, the cover 54 is in a collapsed condition. The cover 54 thus does not cover the entire longitudinal extent of the anchor 56, but covers a lesser portion of the anchor.

The cover 54 is then moved from the collapsed position to an extended position in which the cover 54 covers a greater longitudinal extent of the anchor 56. As the cover 54 is extended, the sleeve portion 86 of the outer tube 62 engages the buckle 96. The longitudinal placement of the locking fingers along the outer tube 62 is selected so that, when the sleeve portion 86 of the outer tube 62 engages the buckle 96, the locking fingers 100, 102, and 104 just pass the end surface 74 of the inner tube 60. The locking fingers 100, 102, and 104 then spring radially inwardly to a position as shown in FIG. 6. The cover 54 can move back toward the collapsed position only a small amount until such movement is blocked by engagement of the fingers 100, 102, and 104 with the end portion 72 of the inner tube 60. The parts of the cover, that is the inner tube 60 and the outer tube 62, are thus interlocked.

In a second embodiment of the invention, the length of the telescoping cover when extended and interlocked is variable to accommodate anchors of different lengths. The outer tube and the inner tube can be interlocked at a selected one of a plurality of longitudinally spaced locations. This second embodiment of the invention is illustrated in FIGS. 10 and 11.

A seat belt buckle anchor cover 128 (FIG. 10) includes an inner tube 130 and an outer tube 132. The outer tube 132 includes a cylindrical portion 134 having an inner wall surface 136. A circumferential projection 138 extends about the inner wall surface 136 of the outer tube 132. The projection 138 projects radially inwardly from the inner wall surface 136 of the outer tube 132. A lower annular surface 140 of the projection 138 extends generally perpendicular to the longitudinal extent of the outer tube 132. An upper angled surface 142 of the projection 138 extends obliquely to the inner wall surface 136 of the outer tube 132.

A series of circumferentially extending ribs 144 are formed on an outer wall surface 146 of the inner tube 130. The ribs 144 are spaced longitudinally along the outer wall surface 146 of the inner tube 130. Each rib 144 has an angled lower sliding surface 148. Each rib 144 also has an upper blocking surface 150 extending generally perpendicular to the longitudinal extent of the inner tube 130. Adjacent ribs 144 define between them a series of notches 152.

When the outer tube 132 and the inner tube 130 are slid apart, from a collapsed position illustrated in FIG. 10 to an extended position illustrated in FIG. 11, the projection 138 engages the series of ribs 144. The angled surface 142 on the projection 138 and the angled sliding surfaces 148 on each rib 144 cooperate to enable the outer tube 132 to move longitudinally relative to the inner tube 130. The projection 138 passes over the ribs 144 in a ratcheting fashion. When the cover 128 is extended to the desired length, the projection 138 comes to rest in one of the notches 152. When the projection 138 is in a notch 152, the lower flat surface 140 of the projection 138 engages the blocking surface 150 of the lower adjacent rib 144. The engagement of surfaces 140 and 150 blocks relative longitudinal movement of the outer tube 132 and the inner tube 130 in the direction from the extended position to the collapsed position. The tubes 130 and 132 are thus interlocked in the extended position.

For assembly of the cover 128 and the anchor 56, without the buckle 96 on the anchor, the cover 128, in a collapsed position, is slid longitudinally over the free end of the anchor 56 to be attached to the buckle. When the end of the inner tube 130 engages the anchor plate 82, it stops further movement of the cover 128. The buckle 96 is then attached to the anchor 56. At this point, the cover 128 is in a collapsed condition. The cover 128 thus does not cover the entire longitudinal extent of the anchor 56, but only covers a lesser portion of the anchor.

The cover 128 is then moved from a collapsed position to an extended position in which the cover 128 covers a greater longitudinal extent of the anchor 56. As the cover 128 is extended, the sleeve portion 86 of the outer tube 132 engages the buckle 96 to block further movement of the outer tube 132 in an extending direction. The longitudinal placement of the ribs 144 along the outer tube 132 is selected so that, when the widened sleeve portion 86 of the outer tube 132 engages the buckle 96, the ribs 144 on the inner tube 130 are in a position to interlock with the projection 138 on the outer tube 132. The projection 138 engages in a selected one of the notches 152 to interlock the inner tube 130 and the outer tube 132 at the desired length. Movement of the cover 128 from the extended position to the collapsed position is blocked by engagement of the projection 138 with the ribs 144.

From the above description of the invention, those skilled in the art will perceive improvements, changes and modifications. Such improvements, changes and modifications within the skill of the art are intended to be covered by the appended claims.

We claim:

1. Apparatus comprising:
   a longitudinally extending fixed-length seat belt buckle anchor having a seat belt buckle fixed at one end of the anchor; and
   a cover for covering said anchor, said cover comprising first and second tubular parts through which the anchor extends, said first and second tubular parts being longitudinally movable relative to said anchor and to each other from a collapsed position covering a first longitudinal extend of said anchor to an extended position covering a second longitudinal extent of said anchor greater than said first longitudinal extent;
   said first and second tubular parts having interlocking portions which interlock when said parts are in the extended condition to block relative movement of said parts from the extended position to the collapsed position.

2. An apparatus as defined in claim 1, wherein said cover comprises a sleeve portion for at least partially enclosing said buckle.

3. An apparatus as defined in claim 1 wherein said interlocking portions comprise first surface means on said first part for engaging second surface means on said second part to interlock said first and second parts.

4. Apparatus as defined in claim 3 wherein said first part is an outer tubular member and said second part is an inner tubular member slidably received in said outer tubular member, said seat belt buckle anchor extending through central passages in said inner and outer tubular members.

5. Apparatus as defined in claim 4 wherein said first surface means includes a surface of a projecting portion of said outer tubular member for engaging said second surface means on said inner tubular member to interlock said outer and inner tubular members.

6. Apparatus as defined in claim 5 wherein said second surface means is an end surface of said inner tubular member and said projecting portion is engageable with said end surface of said inner tubular member to block relative longitudinal movement of said first and second parts from the extended position toward the collapsed position.

7. Apparatus as defined in claim 1 wherein one of said first and second tubular parts engages said buckle when said parts are in the extended condition to block relative movement of said parts from the extended condition away from the collapsed condition, to thereby form a fixed-length cover for covering said fixed-length anchor.

8. A cover for covering a longitudinally extending seat belt buckle anchor, said cover comprising:
   first and second tubular parts through which the anchor extends, said first and second tubular parts being longitudinally movable relative to each other between a collapsed position in which said first and second tubular parts cover a lesser longitudinal extent of the anchor and an extended position in which said first and second tubular parts cover a greater longitudinal extent of the anchor,
   said first and second tubular parts having interlocking portions for blocking relative movement of said first and second tubular parts from the extended position toward the collapsed position;

said interlocking portions being selectively engageable at a plurality of longitudinally spaced locations to vary the extended length of said cover.

9. A cover for covering a longitudinally extending seat belt buckle anchor, said cover comprising:

first and second tubular parts through which the anchor extends, said first and second tubular parts being longitudinally movable relative to each other between a collapsed position in which said first and second tubular parts cover a lesser longitudinal extent of the anchor and an extended position in which said first and second tubular parts cover a greater longitudinal extent of the anchor, said first and second tubular parts having interlocking portions for blocking relative movement of said first and second tubular parts from the extended position toward the collapsed position;

said interlocking portions comprising first surface means on said first part for engaging second surface means on said second part to interlock said first and second parts;

said first part being an outer tubular member and said second part being an inner tubular member slidably received in said outer tubular member, the seat belt buckle anchor extending through central passages in said inner and outer tubular members;

said first surface means including a surface of a projecting portion of said outer tubular member for engaging said second surface means on said inner tubular member to interlock said outer and inner tubular members;

said second surface means being an end surface of said inner tubular member and said projecting portion being engageable with said end surface of said inner tubular member to block relative longitudinal movement of said first and second parts from the extended position toward the collapsed position;

said projecting portion comprising a plurality of projecting fingers which are located on a radially inner circumferential surface of said outer tubular member and which press against an outer surface of said inner tubular member when said cover is in the collapsed position and which move radially inwardly for engagement with an end surface of said inner tubular movement when said cover is in the extended position.

10. A cover for covering a longitudinally extending seat belt buckle anchor, said cover comprising:

first and second tubular parts through which the anchor extends, said first and second tubular parts being longitudinally movable relative to each other between a collapsed position in which said first and second tubular parts cover a lesser longitudinal extent of the anchor and an extended position in which said first and second tubular parts cover a greater longitudinal extent of the anchor, said first and second tubular parts having interlocking portions for blocking relative movement of said first and second tubular parts from the extended position toward the collapsed position;

said interlocking portions comprising first surface means on said first part for engaging second surface means on said second part to interlock said first and second parts;

said first part being an outer tubular member and said second part being an inner tubular member slidably received in said outer tubular member, the seat belt buckle anchor extending through central passages in said inner and outer tubular members;

one of said first and second surface means including a surface of a projection on one of said tubular members extending toward the other one of said tubular member, and the other of said first and second surface means including a plurality of blocking surfaces spaced longitudinally along said other one of said tubular members for selective engagement with said projection to lock said cover in a selected one of a plurality of extended positions.

11. Apparatus as defined in claim 10 wherein said blocking surface are formed on a plurality of circumferentially extending ribs formed on said other one of said tubular members.

12. Apparatus as defined in claim 11 wherein each of said ribs includes a sliding surface for allowing movement of said projection longitudinally over said rib in one longitudinal direction and one of said blocking surfaces for blocking movement of said projection longitudinally over said rib in the opposite longitudinal direction.

13. A cover for covering a longitudinally extending seat belt buckle anchor having an anchor end portion and a buckle end portion, said cover comprising:

first and second tubes;

a portion of one of said tubes being slidably received in the other one of said tubes, said first and second tubes being extendible from a collapsed position in which said first and second tubes cover a lesser longitudinal extent of said anchor to an extended position in which said first and second tubes cover a greater longitudinal extent of said anchor, said first and second tubes having interlocking portions for interlocking said cover in the extended position to block movement of said cover from the extended position toward the collapsed portion;

said second tube being slidably received in said first tube, said interlocking portions comprising first surface means on said first tube for engaging second surface means on said second tube to interlock said first and second tubes;

one of said first and second surface means comprising a surface of a projection and the other one of said first and second surface means comprising a blocking surface of a rib formed on one of said tubes, said rib also including a sliding surface for allowing movement of said projection longitudinally over said rib in one longitudinal direction said blocking surface blocking movement of said projection longitudinally over said rib in one longitudinal direction said blocking surface blocking movement of said projection longitudinally over said rib in the opposite longitudinal direction.

14. A cover for covering a longitudinally extending seat belt buckle anchor having an anchor end portion and a buckle end portion, said cover comprising:

first and second tubes;

a portion of one of said tubes being slidably received in the other one of said tubes, said first and second tubes being extendible from a collapsed position in which said first and second tubes cover a lesser longitudinal extent of said anchor to an extended position in which said first and second tubes cover a greater longitudinal extent of said anchor, said first and second tubes having interlocking portions for interlocking said cover in the extended position to block movement of said cover from the extended position toward the collapsed portion;

said second tube being slidably received in said first tube, said interlocking portions comprising first surface means on said first tube for engaging second surface means on said second tube to interlock said first and second tubes;

said second surface means comprising an end surface on said second tube;

said first surface means comprising a surface of a finger disposed on an inner surface of said first tube, said finger being held radially outward by an outer surface of said second tube when said cover is in the collapsed position, said finger moving radially inwardly into a position to engage said end surface of said second tube when said cover is in the extended position.

15. Apparatus comprising:

a longitudinally extending fixed-length seat belt buckle anchor;

a cover for covering said anchor, said cover comprising first and second tubular members, a portion of one of said first and second tubular members being slidably received in the other one of said first and second tubular members, said cover being movable between a collapsed position in which said first and second tubular members cover a lesser longitudinal extent of said anchor and an extended position in which said first and second tubular members cover a greater longitudinal extent;

a projection on one of said tubular members, and a plurality of blocking surfaces spaced longitudinally along the other of said tubular members for selective engagement with said projection to lock said cover in a selected one of a plurality of extended positions by blocking movement of said projection longitudinally over said blocking surfaces in a direction of movement of said cover from the extended position toward the collapsed position.

16. Apparatus as defined in claim 15 wherein each of said respective blocking surfaces comprises a surface on a respective one of a series of ribs on said other of said tubular members, each rib comprising an angled sliding surface and a blocking surface extending generally perpendicular to the longitudinal extent of said other of said tubular members to allow movement of said projection in a first direction along said series of ribs and not allow movement of said projection in a second direction along said series of ribs.

* * * * *

UNITED STATES PATENT AND TRADEMARK OFFICE
CERTIFICATE OF CORRECTION

PATENT NO. : 5,098,162
DATED       : March 24, 1992
INVENTOR(S) : Ken M. Forget and Mark F. Gray It is certified that error appears in the above-identified patent and that said Letters Patent is hereby corrected as shown below:

Column 6, Line 14, Claim 1, change "extend" to --extent--.

Column 7, Line 46, Claim 9, change "movement" to --member--.

Column 8, Line 6, Claim 10, change "member" to --members--.

Column 8, Line 13, Claim 11, Change "surface" to --surfaces--.

Column 8, Lines 52, 53, 54, Claim 13, delete "in one longitudinal direction said blocking surface blocking movement of said projection longitudinally over said rib".

Column 10, Line 6, Claim 15, after "extent" insert --of said anchor--.

Signed and Sealed this

Fifteenth Day of June, 1993

Attest:

MICHAEL K. KIRK

Attesting Officer

Acting Commissioner of Patents and Trademarks